United States Patent

Jucius, Jr. et al.

[11] 3,876,261
[45] Apr. 8, 1975

[54] OUTLET GATE FOR HOPPERS

[75] Inventors: Joseph J. Jucius, Jr., Chicago Heights; Eugene Lubieniecki, Blue Island, both of Ill.

[73] Assignee: North American Car Corporation, Chicago, Ill.

[22] Filed: Sept. 27, 1972

[21] Appl. No.: 292,816

[52] U.S. Cl. ................................. 302/52; 222/554
[51] Int. Cl. ........................................... B65g 53/40
[58] Field of Search .................. 302/52; 214/82.28; 105/280, 283; 222/193, 548, 554, 555, 564

[56] References Cited
UNITED STATES PATENTS

| | | |
|---|---|---|
| 3,215,473 | 11/1965 | Kemp et al. .......................... 302/52 |
| 3,306,675 | 2/1967 | Fritz ...................................... 302/52 |
| 3,408,117 | 10/1968 | Koranna ..................... 214/83.28 X |
| 3,482,741 | 12/1969 | Fritz ...................................... 222/554 |
| 3,778,114 | 12/1973 | Carney ................................. 302/52 |

*Primary Examiner*—Robert B. Reeves
*Assistant Examiner*—Larry M. Martin
*Attorney, Agent, or Firm*—Molinare, Allegretti, Newitt & Witcoff

[57] ABSTRACT

An outlet structure for securement to the bottom of a hopper, such as hoppers embodied in railroad cars and trailers, for controlled discharge of dry bulk commodities from the hopper by the use of a vacuum unloading system.

8 Claims, 9 Drawing Figures

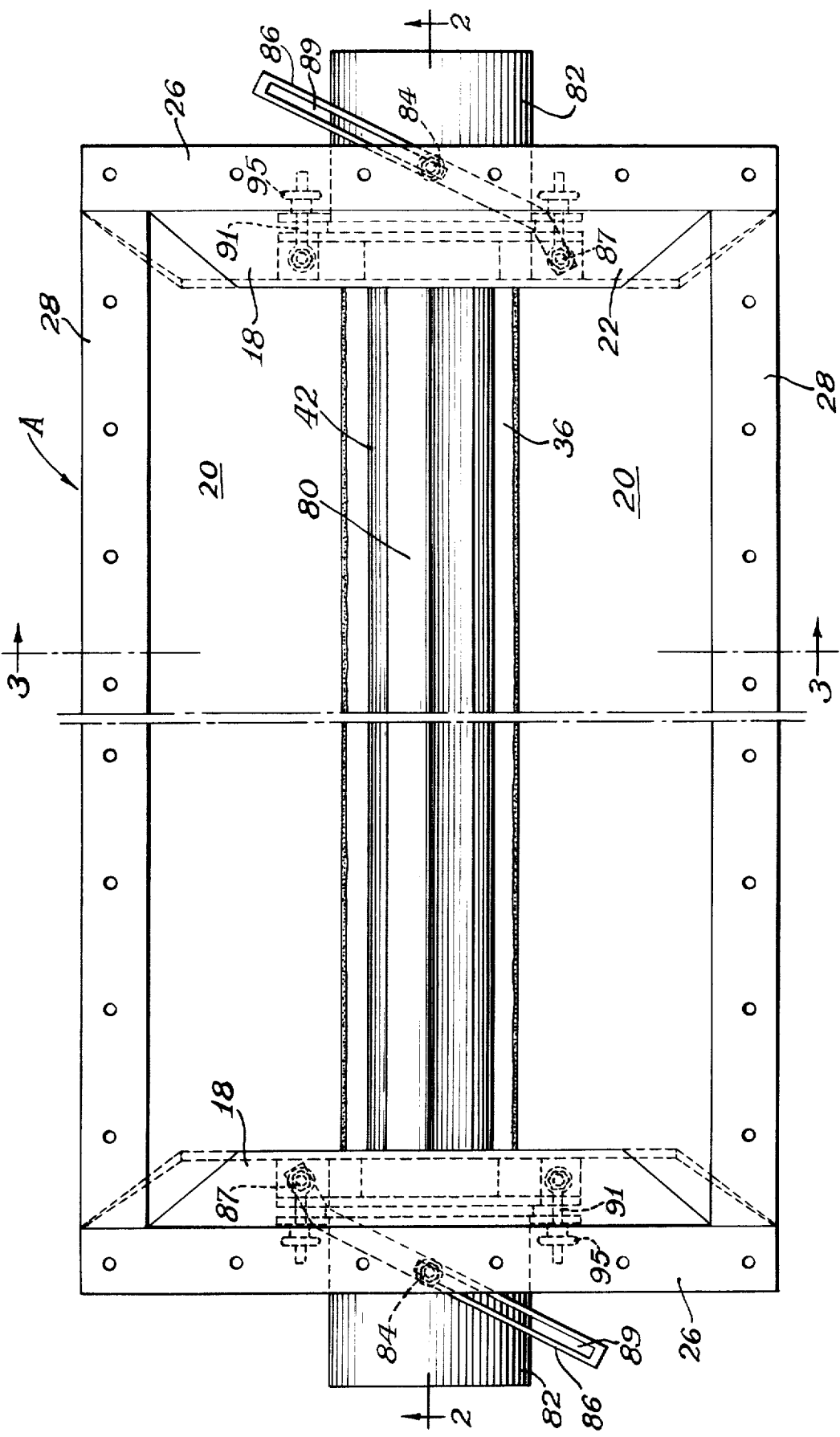

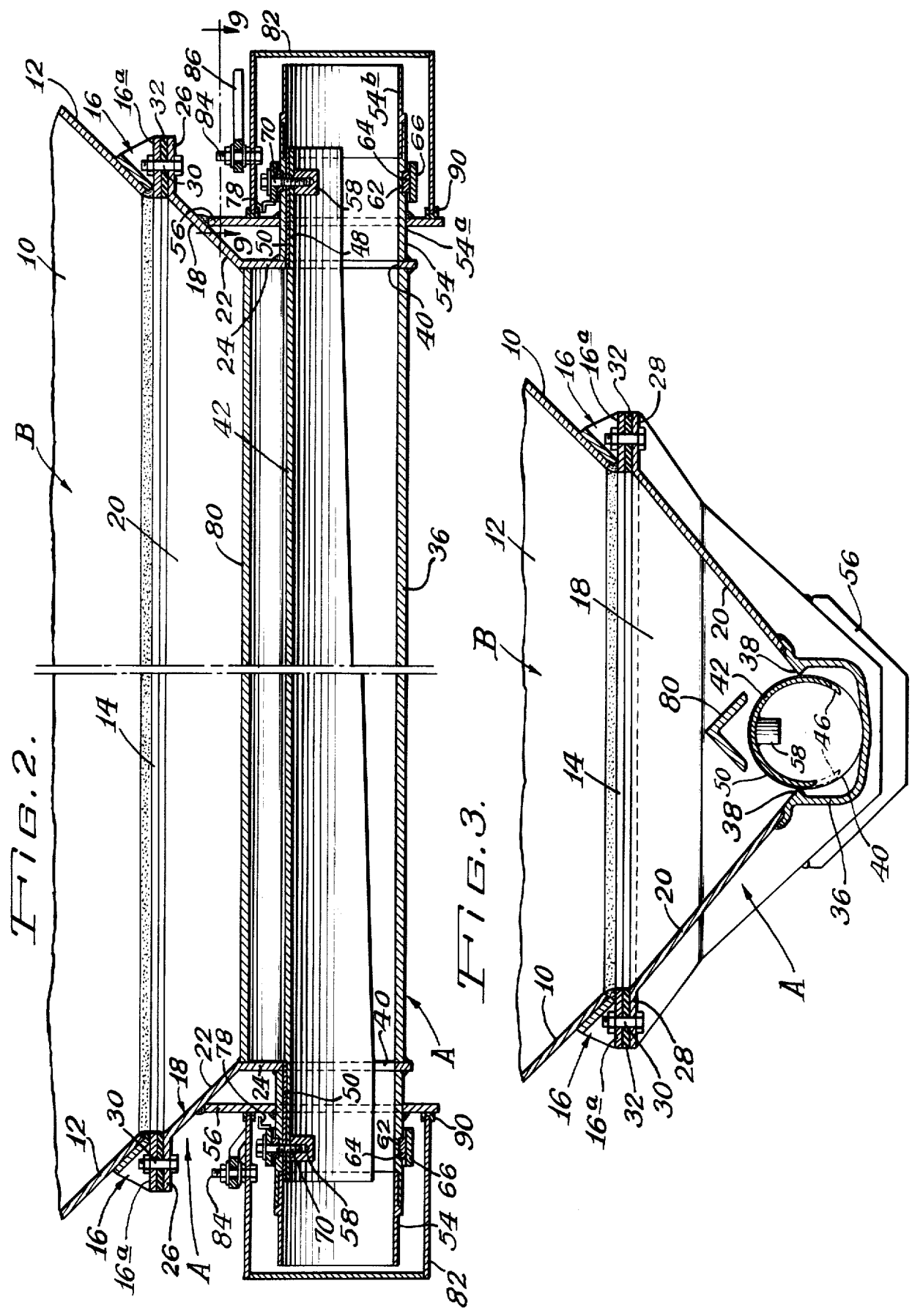

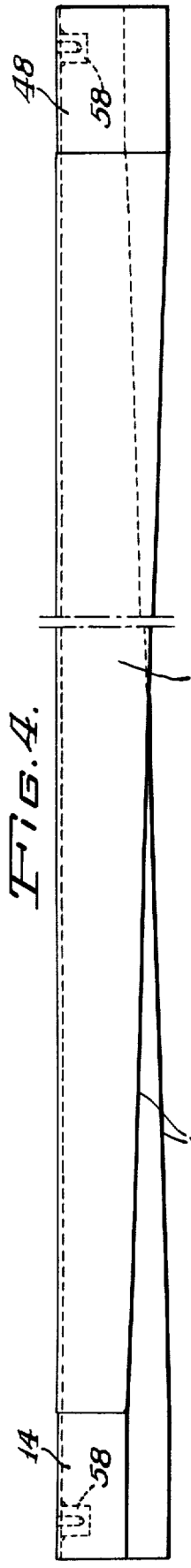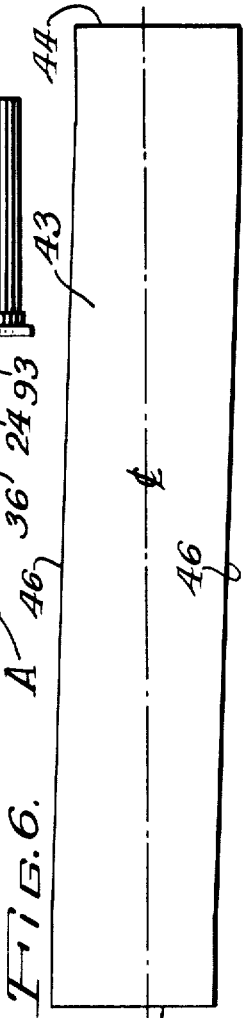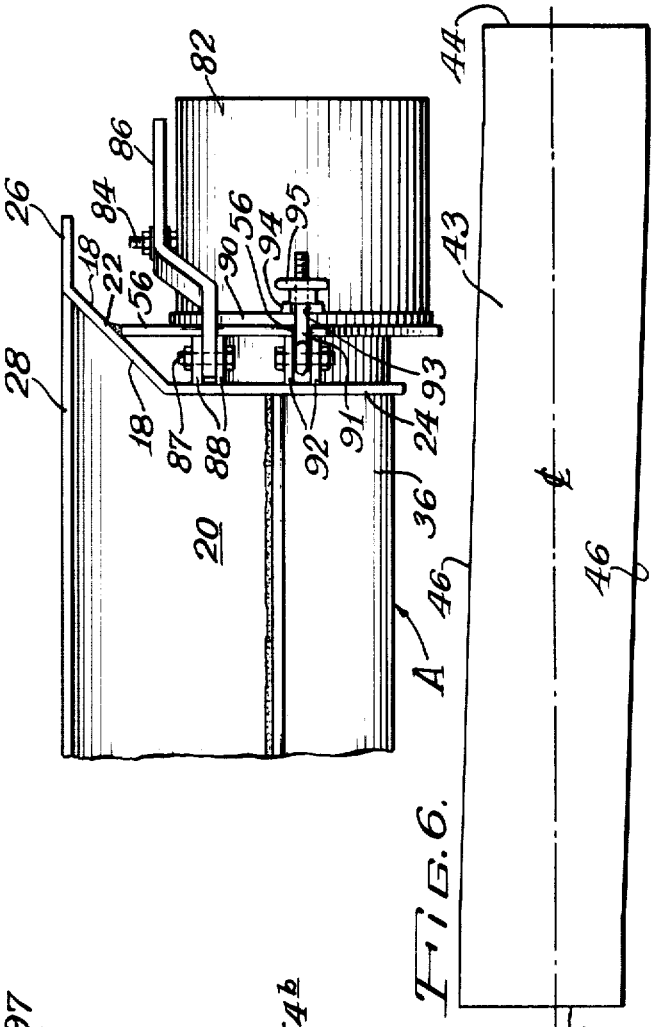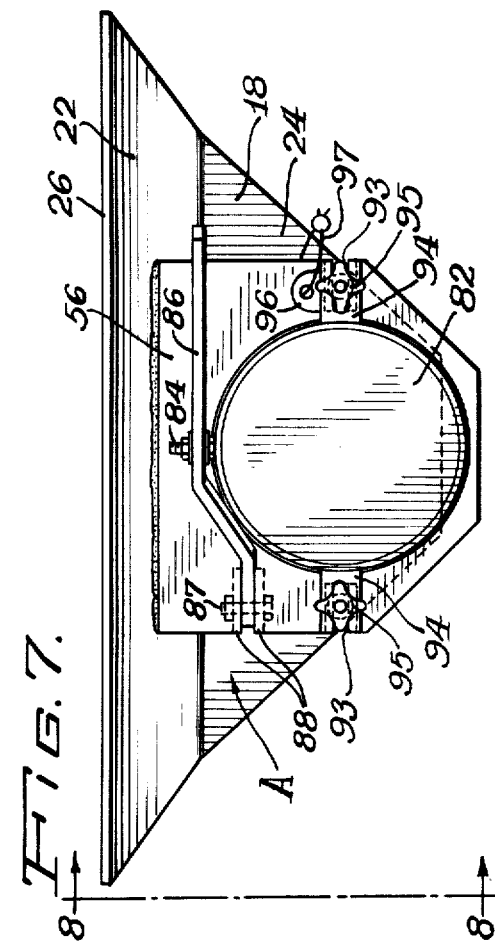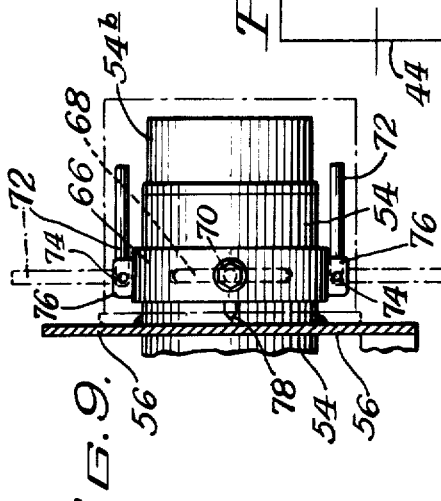

OUTLET GATE FOR HOPPERS

BACKGROUND OF THE INVENTION

This invention relates to hopper discharge apparatus, sometimes known as pneumatically operated outlet structures or outlet gates for securement to the bottom of hoppers carried by vehicles such as railroad cars and trailers for transporting dry bulk commodities. Such commodities may be in the nature of pellets, granular or pulverulent material which is capable of being discharged from the hoppers by a conventional vacuum unloading system.

The majority of prior pneumatic unloading outlet structures utilize a rotatably adjustable tubular valve member positioned in a trough structure or another tubular member. Such valve members have been provided in various forms and with various shapes of cutouts or openings through which commodity is permitted to flow from the hopper into the tubular valve member from which it is discharged. Such prior structures, due to their particular design and the relationship of the valve member to the walls of the outlet structure and/or to other tubular members or trough-like structures permit commodity to enter between the valve and such other structures which results in binding and imposing excess friction upon the valve element so as to require great force for rotatably adjusting the valve element from one position to another, as well as requiring substantial time in clean out of the residual commodity between the valve element and the surrounding tubular element or trough structure. Other prior pneumatic unloading structures, such as disclosed in FIG. 12 of Kemp et al. U.S. Pat. No. 3,194,420, dated July 13, 1965 and Fritz U.S. Pat. No. 3,482,741, dated Dec. 9, 1969 disclose non-tubular forms of valve members positioned in trough-like structures. In these latter prior structures, the valve elements are of special design and because of their relationship to a pair of spaced apart lips associated with a discharge passageway controlled by the valve elements, the weight of the commodity imposed upon the entire exposed upwardly facing surface of the valve elements is quite substantial, and thus requires substantial force in rotating the valve element to different positions of adjustment. Sometimes such valve elements, incident to their movement, tend to wedge commodity in the zone of the lips of the passageway thus causing additional friction and impeding adjustment of the valve element.

One of the objects of this invention is to provide a novel outlet structure which is constructed and arranged so as to substantially eliminate binding friction of the commodity incident to movement of the valve element.

Another object is to provide a novel outlet structure in the form of a valve gate of segmental, arcuate form together with a hood mounted centrally above the valve gate so that the major portion of the weight of the commodity contacting the valve gate is transmitted approximately tangentially to the exposed arcuate surface of the valve gate and by virtue of which the valve gate may be rotatably adjusted with minimum effort.

A further object is to provide a novel form of valve gate which permits obtaining fine metered control of the discharge of the commodity from the hopper into the passageway for unobstructed flow directly into a trough structure for insuring efficient pneumatic unloading of the commodity directly from the trough structure.

Still another object of this invention is to provide an improved outlet structure having novel journal supports for the segmental valve gate for rotatable movement or adjustment thereof independently of outlet conduits, so that rotatable adjustment of the valve gate may be quickly and easily made with minimal effort, and witout the imposition of any restraint from the hose of the pneumatic discharge system when it is coupled to one of the outlet conduits.

A still further object of this invention are to provide a novel outlet structure of the character indicated which is simple in construction, economical to manufacture and which permits substantially complete and efficient removal of all of the commodity from the hopper through the pneumatic discharge system.

Other objects and advantages of this invention will be apparent from the accompanying drawings.

BRIEF DESCRIPTION OF THE DRAWINGS

FIG. 1 is a top plan view of the outlet structure embodying the present invention;

FIG. 2 is a vertical, longitudinal sectional view through the outlet structure, taken substantially as indicated at lines 2—2 on FIG. 1 and showing the manner of connection of the outlet structure to the bottom of a hopper;

FIG. 3 is a vertical, transverse sectional view through the outlet structure, taken substantially as indicated at lines 3—3 on FIG. 1;

FIG. 4 is a side elevational view of the novel valve gate member forming a part of the present invention;

FIG. 5 is an end elevational view of the valve gate member;

FIG. 6 is a plan view of the sheet metal blank utilized in making the valve gate member;

FIG. 7 is an end elevational view of the outlet structure embodying the present invention;

FIG. 8 is a fragmentary side elevational view of one end portion of the outlet structure, taken as indicated at lines 8—8 on FIG. 7; and FIG. 9 is a top plan view of one of the discharge end portions of the outlet structures, taken as indicated at lines 9—9 on FIG. 2.

DESCRIPTION OF THE PREFERRED EMBODIMENT

The outlet structure comprising the present invention is a unitary assembly indicated at A, which is sometimes referred to as a bottom hopper section, attached to the bottom of a main hopper body B, as seen in FIGS. 2 and 3 of the drawings. The main hopper body is formed with interconnected lower side and end walls 10 and 12, respectively, which taper downwardly and inwardly to define a generally rectangular opening 14. Secured externally, as by welding, to the lower edges of the side and end walls 10 and 12 of the main hopper body is an angle iron frame 16, of generally rectangular form, which frame includes a laterally extending mounting flange 16a.

The outlet structure or bottom hopper section A, embodying the present invention, is a unitary assembly having a pair of end walls 18 and a pair of side walls 20 which are interconnected together as by welding. The end walls 18 include inclined portions 22 which when the outlet structure is connected to the main hopper are disposed at approximately the same angle as the end walls 12 of the main hopper B. Depending from the inclined portions 22 are vertically extending portions 24 and the upper ends of the inclined portions 18 terminate in laterally extending flanges 26. The side walls 20 are disposed at approximately the same angle as the inclined walls 10 of the main hopper body B and the upper ends of said side walls terminate in laterally extending flanges 28. The flanges 26 and 28 of the respective end and side walls define a rectangular frame as seen in FIG. 1 of the drawings of substantially the same size as frame 16 of the main hopper body. Said flanges 26 and 28 are secured to the laterally extending mounting flanges 16a of the main hopper body by bolts 30, with a gasket 32 interposed between the two sets of flanges.

As may be seen in FIG. 3 of the drawings, the side walls 20 terminate in spaced apart relation to each other, and secured as by welding, to the lower edges of the side walls 20 is an upwardly open, generally U-shaped, elongated trough member 36. The trough member is welded at its opposite ends to the inner surface of the upright portions 24 of the end walls 18. The upper inner portions of each side wall of the trough member are formed to provide relatively sharp edge lip portions 38 and define an elongated passageway through which commodity in the hopper is permitted, under controlled conditions, to flow into the trough member 36. If desired, the trough member 36 may be so designed to omit lip portions and is secured to the underside of the sloping side walls 20 in a manner so that the lower edge of the side walls 20 terminate in sharp knife edges to consitute lip portions for performing the same function as the lip portion forming a part of the trough member 36.

Each of the vertical portions 24 of the end walls 18 is formed with a circular outlet opening 40, the lower edge of which is tangent to the bottom wall of the trough member 36 as seen in FIGS. 2 and 3 of the drawings.

Mounted in the passageway defined by the lips 38 of the trough member is a valve gate or shutter element 42 which is a segment of an arc of more than 180° arcuate extent and less than 300° arcuate extent. The valve gate is formed from a flat sheet of metal 43, as seen in FIG. 6, having a pair of parallel ends 44 and a pair of parallel longitudinal edges 46 which are cut on a bias or acute angle with respect to the medium plane of the sheet of metal. The sheet of metal is rolled to form a relatively true arc, as above defined, having end portions 48 which are machined to a true dimension and which constitute bearing supports for the valve gate. As may be seen in FIG. 4 of the drawings, the longitudinal edges 46, intermediate the bearing portions 48, are straight edges disposed at acute angles with respect to a plane passing through the axis about which the arcuate form of the valve gate is generated and the opposite longitudinal edge portions 46 are biased in opposite relationship to each other. Each of the finished end portions 48 of the valve gate has bonded to the exterior thereof a strip of Teflon material 50 and is journal supported in a tubular outlet 54, which is composed of two tubular parts 54a and 54b which are telescoped together in a press fitted relation. Welded to the inclined portion 22 of each of the end walls 18, is a vertically disposed face plate 56 which is provided with a suitable opening and the two piece discharge outlet conduits 54 are supported in respective openings in the face plates and are welded thereto and the inner ends of said conduits are likewise welded to the outer surface of the vertical portions 24 of the end walls. The internal diameter of the outlet conduits correspond to the size of and are positioned in alignment with the openings 40 in the vertical portions 24 of the end walls 18.

Welded to the inner surface of each of the end portions 48 of the valve gate 42, as seen in FIGS. 4 and 5, of the drawings are bosses 58 which are drilled and threaded for the reception of a connection member to be hereinafter described.

The external surface of each of the outlet conduits 54 is formed with an annular groove 62 in which is seated a bearing 64 of Teflon material. These bearings may be in the form of a strip of material or in the form of a split ring. Mounted in surrounding relation to the Teflon bearings on each of the outlet conduits is a control collar 66 and extending through an opening in each collar and through the nylon bearing 64 and an arcuate slot 68, formed in the outlet conduit 54, is a cap screw 70 which is threaded into the opening in a boss 58 at the end of the valve gate, as seen in FIGS. 2 and 9 of the drawings. By virtue of this connection, any rotary movement of the collar imparts corresponding rotary movement to the valve gate. For convenience in rotating either collar, the collars are each provided with a pair of diametrically oppositely positioned handles 72, pivoted at 74 between a pair of spaced lugs 76, extending from the side walls of collars 66. The handle 72, when it is desired to rotate the gate valve to a desired position of angular adjustment, is swung to the dot and dash position indicated in FIG. 9 and when not in use, they may be folded in close relation to the outlet conduit 54. Welded to the upper inner edge of the collar 66 is an indicator member or pointer 78, which is adapted to register with suitable indicia (not shown) provided on the face of the face plate 56 to indicate the position of the adjustment of the valve gate. When the collar is adjusted in axial alignment as shown in FIG. 9, the valve gate is disposed in closed position, as seen in FIG. 3 of the drawings.

The outlet conduits and other associated parts including control collars are identical at opposite ends of the outlet structure so as to permit the vehicle to be placed on a siding or other convenient location and enable the commodity in the hopper to be discharged from either side of the vehicle.

Mounted above the valve gate 42 is a hood or deflector member 80, having a pair of angular related legs overlying the main top central area of the entire length of the valve gate as seen in FIG. 3 of the drawings. The hood member is of elongated form and is welded at opposite ends to the inner surfaces of the vertical portions 24 of the end plates 18 as seen in FIG. 2 of the drawings. The purpose of the hood or deflector is to insure that the commodity as it is being discharged through the valve gate 42 into the trough member 36, is directed in a path so as to flow through the opening created by adjustment of a longitudinal edge 46 of the gate valve relative to a corresponding lip 38.

As may be seen in FIG. 3 of the drawing, the gate valve is formed and positioned in the passageway, as defined by the spaced apart lips 38, so that the large portion of its arcuate extent is positioned above said lips. Due to the form of the hood and its position with respect to the valve gate, it will be apparent that the weight of the commodity upon the remaining exposed upper surface of the valve gate, intermediate the lips and the lower edges of the legs of the hood 80 is such that a substantial portion of the weight of the commodity imposed upon the exposed surface of the valve gate intermediate the lips 38 and the lower edges of the legs of the hood 80, is approximately tangential to the exposed portions of the valve gate. In other words, the exposed portions of the valve gate, above the lips extends in the main in a generally upward direction. By virtue of this construction, the load of the commodity imposed upon the gate is relatively light and due to the fact that the ends of the valve gate are journal supported in Teflon bearings and there is no movement of any part of the outlet conduit 54, nor the hose of the pneumaticvacuum system connected to the outer end of the outlet conduit incident to moving the valve gate, any rotative adjustment of the gate is accomplished by exerting a minimum effort. Because of the acute angle of the longitudinal edges 46 of the valve gate, it is possible for the gate to be adjusted in such manner so as to obtain relatively fine metered control of discharge of the commodity between a lip and a corresponding edge 46 of the valve gate when it is rotatively adjusted. By virtue of this construction, the commodity is caused to flow unobstructively into the trough 36 for pneumatic discharge through a hose coupled to the outer end of one of the outlet conduits 54 of a pneumatic discharge system. It is to be understood that in order to effect a discharge of the commodity from the hopper into the trough and through the pneumatic discharge system that the outlet conduit at the end opposite the outlet structure is vented to atmosphere and preferably one or more hatches of the main hopper body are in open position.

It will also be apparent that by virtue of the present invention, it is possible to quickly and easily cleanse the trough of any residual commodity after the main body of commodity has been discharged fron the hopper. By virtue of the novel construction substantially all binding and wedging action caused by material adjacent the valve gate and a lip is substantially eliminated, together with the novel construction and arrangement of the valve gate and hood by virtue of which minimal weight of commodity is transferred directly to the exposed surface of the valve gate, rotatable adjustment of the valve gate may be accomplished with minimum effort.

Because hopper type railroad cars in transit with a load of commodity move through various weather zones, such as areas subject to dust or in flood areas and because it sometimes happens that foreign material such as dust, water, etc. might enter the outlet conduits of the outlet structure such a condition might result in contamination of the load of commodity. Because the handles 72 associated with the collar 66 may be folded in close relation to the outlet conduits 54, as seen in FIG. 9 of the drawings, it is possible to provide a substantial closure and seal for each of the outlet ends of the outlet structure. For this purpose, cup shaped closure members 82 are utilized for totally surrounding outlet ends of the outlet structure, including the handles 72 as seen in the drawings. Pivotally connected to the top of each cup shaped member, as indicated at 84, is a supporting arm 86 which in turn has its opposite end pivotally connected at 87 between a pair of spaced apart lugs 88, secured to the outer surface of the vertical portion 24 of the end wall. The arm 86 is provided with an elongated slot 89 in registration with pivot 84, so as to permit free movement of the closure member 82 into and out of sealing relation to the outer end of the discharge outlet of the outlet structure. The free marginal edge of the cup shaped member is provided with a resilient gasket 90 adapted to be firmly seated against the outer surface of the face plate 56, to form a water tight seal around the outlet end of the outlet structure. Each closure is firmly secured in sealed relation by a pair of eye bolts 91, pivoted between pairs of lugs 92 on the outer surface of the upright portion 24 of the end wall, at opposite sides of the closure 82, with intermediate portions of the eye bolts being movable into slots 56a formed in opposite edges of the face plate 56, and slots 93 formed in ears 94 extending from opposite sides of the closure 82. A hand nut 95 is threaded on the outer end of each of the eye bolts to exert pressure on the lugs 94 of the cup shaped member urging it inwardly to firmly press the gasket 90 against the face plate 56 and thereby maintain and provide a tight sealing engagement of the gasket against the face plate, around the outlet end of the outlet conduit 54. One of the lugs 94, opposite the pivot connection 87, is provided with an upstanding lug 96, formed with an aperture adapted to be registered with an aperture provided in the face plate 56 and through which registered apertures a conventional lead-wire seal 97 is attached to visibly indicate whether or not a closure has been tampered with prior to the vehicle arriving at its destination where the commodity in the hopper is to be discharged.

We claim:

1. An outlet structure adapted to be secured beneath a hopper structure comprising a pair of oppositely facing, downwardly and inwardly converging side wall members with the lower edges terminating in spaced apart relation, a pair of end walls connected to said side wall members, an elongated, upwardly open trough shaped member connected to the lower portions of said side wall members, a pair of spaced apart lip adjacent the connection between said trough shaped member and said side wall members defining an elongated passageway in registration with the interior of the trough member, said end walls being formed with outlet openings in registration with the ends of the trough member, stationary outlet conduits fixedly connected to the exterior of said end walls in registration with said outlet openings, an elongated valve gate of segmental, arcuate cross section, of more than 180° arcuate extent over its length, positioned in said passageway in close cooperating relation to said lips, the arcuate cross section ends of said valve gate being journaled in said outlet conduits for rotary movement therein, and valve gate operating means associated with at least one of said outlet conduits and having a connection extending through an arcuate slot formed in said one outlet conduit and fixedly connected to the adjacent end of said valve gate for rotatably adjusting one longitudinal edge of said valve gate relative to one of said lips for controlling the discharge of material through said passageway for unobstructed flow directly into the trough member for pneumatic unloading of the material through one of the outlet conduits, one longitudinal edge of said valve gate, intermediate said end walls, extending at an acute angle to the axis of rotation of the valve gate for providing metered control of discharge of material from the hopper for unobstructed flow directly into the said trough member incident to the rotative adjustment of said valve gate.

2. An outlet structure according to claim 1, wherein said valve gate is dimensioned and positioned with the major portion of its arcuate surface, between the end walls, extending above said pair of lips when the valve gate is in a closed position.

3. An outlet structure according to claim 2, including an elongated hood connected at its ends to said end wall and positioned above and in spaced relation the the valve gate, said hood having a pair of downwardly and outwardly extending legs, whereby a substantial portion of the weight of the material on the remaining upwardly exposed arcuate portions of the valve gate is transmitted approximately tangentially to the exposed arcuate portions of the valve gate.

4. An outlet structure according to claim 1, wherein the angle of transverse arcuate extent of said valve gate is less than 300°.

5. An outlet structure according to claim 1, wherein both of the longitudinal edges of the valve gate, intermediate said end walls, extend at acute angles to the axis of rotation of the valve gate for providing selective metered control of discharge of material from the hopper, between either lip and an adjacent longitudinal edge of the valve gate for unobstructed flow of material directly into the trough member incident to rotative adjustment of said valve gate.

6. An outlet structure according to claim 5, wherein the longitudinal edges of said valve gate extend at acute angles in opposite directions.

7. An outlet structure according to claim 6, wherein the angle of transverse arcuate extent of said valve gate is more than 180° and less than 300°.

8. An outlet structure according to claim 6, wherein said valve gate is formed from a rolled elongated sheet metal blank defining an elongated element of segmental, arcuate cross section, said blank having a pair of parallel ends and a pair of side edges which extend at an acute angle to the median longitudinal plane of the blank.

* * * * *